United States Patent [19]

Winnik et al.

[11] Patent Number: 4,877,451

[45] Date of Patent: Oct. 31, 1989

[54] INK JET INKS CONTAINING COLORED SILICA PARTICLES

[75] Inventors: Francoise M. Winnik, Toronto; Barkev Keoshkerian, Thornhill, both of Canada

[73] Assignee: Xerox Corporation, Stamford, Conn.

[21] Appl. No.: 232,967

[22] Filed: Aug. 17, 1988

[51] Int. Cl.[4] .............................................. C09D 11/02
[52] U.S. Cl. ................................. 106/23; 106/287.11; 106/287.14; 106/490
[58] Field of Search ................ 106/23, 287.11, 287.14, 106/490

[56] References Cited

U.S. PATENT DOCUMENTS

| | | | |
|---|---|---|---|
| 3,290,165 | 12/1966 | Iannicelli et al. | 106/490 |
| 3,834,924 | 9/1974 | Grillo | 106/490 |
| 3,939,087 | 2/1976 | Vijayendran et al. | 106/23 |
| 4,197,135 | 4/1980 | Bailey et al. | 106/23 |
| 4,210,916 | 7/1980 | Mansukhani | 346/1.1 |
| 4,566,908 | 1/1986 | Nakatani et al. | 106/308 N |
| 4,576,888 | 3/1986 | Miyakawa et al. | 106/490 |
| 4,597,794 | 7/1986 | Ohta et al. | 106/20 |
| 4,685,968 | 8/1987 | Palmer | 106/23 |
| 4,689,078 | 8/1987 | Koike et al. | 106/22 |
| 4,705,567 | 11/1987 | Hair et al. | 106/20 |

FOREIGN PATENT DOCUMENTS 3330380  3/1979  Fed. Rep. of Germany .

OTHER PUBLICATIONS

Journal of Chromatography, 299(1984), pp. 175 to 183, Ledger et al., "Preparation and Analysis of Reactive Blue 2 Bonded to Silica Via Variable Spacer Groups".

*Primary Examiner*—Paul Lieberman
*Assistant Examiner*—Helene Kirschner
*Attorney, Agent, or Firm*—Judith L. Byorick

[57] ABSTRACT

An ink jet ink composition which comprises water, a solvent, and a plurality of colored particles comprising hydrophilic porous silica particles, to the surfaces of which dyes are covalently bonded through silane coupling agents. The particles are prepared by a process which copmrises reacting hydrophilic porous silica particles with a silane coupling agent in the absence of water to form particles having covalently attached thereto coupling agents, followed by reacting a dye with the coupling agent attached to the silica particles.

47 Claims, No Drawings

INK JET INKS CONTAINING COLORED SILICA PARTICLES

BACKGROUND OF THE INVENTION

The present invention is directed to ink compositions suitable for ink jet printing. More specifically, the present invention is directed to a process for preparing colored silica particles and to ink jet ink compositions containing these particles. One embodiment of the present invention is directed to an ink jet ink composition comprising water, a solvent, and hydrophilic porous silica particles having dyes covalently bonded to the particle surfaces through silane coupling agents. The colored silica particles can be prepared by reacting hydrophilic porous silica particles with a silane coupling agent in the absence of water to form silica particles with the coupling agents covalently bonded thereto, followed by reacting a dye with the coupling agent. Another embodiment of the present invention is directed to a process for generating images by ink jet processes with the ink compositions illustrated herein.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specfic location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, they are much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The second type of drop-on-demand system is known as thermal ink jet, or bubble jet, and produces high velocity droplets and allows very close spacing of nozzles. The major components of this type of drop-on-demand system are an ink-filled channel having a nozzle on one end and a heat generating resistor near the nozzle. Printing signals representing digital information originate an electric current pulse in a resistive layer within each ink passageway near the orifice or nozzle causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described, for example, in U.S. Pat. Nos. 4,601,777; 4,251,824; 4,410,899; 4,412,224; and 4,532,530, the disclosures of each of which are totally incorporated herein by reference.

Ink jet inks are also known. For example, U.S. Pat. No. 4,197,135 discloses an ink with a pH of 8 or more for use in ink jet printers, which contains a water soluble dye and a polyamine containing 7 or more nitrogen atoms per molecule. In addition, U.S. Pat. No. 4,210,916 discloses an ink composition for use in jet printing comprising an aqueous solution of a water-soluble dye and a humectant consisting of at least one water-soluble alkene diol or alkene polyol compound. Further, U.S. Pat. No. 4,685,968 discloses a process for preparing an aqueous-based ink composition for use in ink jet printers, which comprises forming a solution of a dye having at least one negatively charged functional group per molecule, acidifying the solution, cycling the solution through a reverse osmosis membrane to form a concentrate and a permeate, the concentrate including a cation of the compound associated with at least one functional group on the dye and the permeate including a cation formerly associated with at least one functional group, adding water as necessary, concentrating the dye by reverse osmosis, and admixing the concentrated dye with at least one glycol ether. Another patent, U.S. Pat. No. 4,689,078, discloses a recording liquid suitable for ink jet recording comprising a liquid composition containing a disperse dye in which the purity of the disperse dye is 90 percent or higher.

Heterophase ink jet inks are also known. For example, U.S. Pat. No. 4,705,567 discloses a heterophase ink jet ink composition which comprises water and a dye covalently attached to a component selected from the group consisting of poly(ethylene glycols) and poly(ethylene imines), which component is complexed with a heteropolyanion. In addition, U.S. Pat. No. 4,597,794 discloses an ink jet recording process which comprises forming droplets of an ink and recording on an image receiving material by using the droplets, wherein the ink is prepared by dispersing fine particles of a pigment into an aqueous dispersion medium containing a polymer having both a hydrophilic and a hydrophobic construction portion. The hydrophilic portion constitutes a polymer of monomers having mainly polymerizable vinyl groups into which hydrophilic portions such as carboxylic acid groups, sulfonic acid groups, sulfate groups, and the like are introduced. Pigment particle size may be from several microns to several hundred microns. The ink compositions disclosed may also include additives such as surfactants, salts, resins, and dyes.

In addition, processes for the production of colored silica particles are known. For example, U.S. Pat. No. 4,566,908 discloses an azoic pigment suitable for use in an electrophotographic toner having a silica core comprising a core of a fine powder of silica having a particle diameter of not more than 10 microns and a coating of a mono- or polyazoic dye chemically bound to the surface of the silica core through an aminosilane coupling agent. The process for preparing these colored silica particles is detailed at columns 8 to 18 of the patent. In addition, R. Ledger and E. Stellwagen, "Preparation and Analysis of Reactive Blue 2 Bonded to Silica Via Variable Spacer Groups," *Journal of Chromatography*, vol. 299, pages 175 to 183 (1984), discloses processes for preparing colored silica particles by covalently attaching Reactive Blue 2 dye to silica particles through various spacer groups. The disclosure of this article is totally incorporated herein by reference.

Further, colored polymeric particles having a dye covalently attached to the polymeric particles are illustrated in, for example, copending application U.S. Ser. No. 143,790, entitled "Process for Preparing Colored Particles and Liquid Developer Compositions Thereof". Processes for preparing silica based charge enhancing additives wherein a tetraalkoxysilane is reacted with an alcoholic alkaline solution in the presence of a soluble silica based charge enhancing additive are also disclosed in copending application U.S. Ser. No. (not yet assigned; D/88094, entitled "Processes for the Preparation of Silica Containing Charge Enhancing Additives" with the named inventors Françoise M. Winnik and Yves Deslandes). Additionally, West German Patent Publication DE-3,330,380 discloses alkoxyaminosilanes which are chemically reacted with free silanol groups.

Of background interest are U.S. Pat. Nos. 2,876,119; 2,993,809; 3,939,087; 4,179,537; and 4,204,871.

Although the above described ink jet inks and processes for preparing colored silica are suitable for their intended purposes, a need continues to exist for heterophase ink jet inks that exhibit improved waterfastness, reduced feathering, and compatibility with plain paper. A need also exists for heterophase ink jet inks wherein the particles are thermally stable. Further, there is a need for ink jet inks available in a wide variety of colors. There is also a need for ink jet inks with reduced toxicity. In addition, a need continues to exist for simple and economical processes for preparing colored particles suitable for heterophase ink jet inks.

SUMMARY OF THE INVENTION

It is an object of the present invention to provide heterophase ink jet inks that exhibit improved waterfastness, reduced feathering, and compatibility with plain paper.

It is still another object of the present invention to provide heterophase ink jet inks wherein the particles are thermally stable.

It is yet another object of the present invention to provide ink jet inks available in a wide variety of colors.

Another object of the present invention is to provide ink jet inks with reduced toxicity.

Still another object of the present invention is to provide simple and economical processes for preparing colored particles suitable as colorants for heterophase ink jet inks.

These and other objects of the present invention are achieved by providing an ink composition suitable for ink jet printing which comprises water, a solvent, and a plurality of particles comprising hydrophilic porous silica particles wherein dyes are covalently bonded to the particle surface through silane coupling agents. The colored silica particles are prepared by a process comprising the reaction of hydrophilic porous silica particles with a silane coupling agent in the absence of water to form particles having covalently attached thereto coupling agents, followed by reaction of a dye with the coupling agent. Also encompassed by the present invention is a process for generating images which comprises incorporating into an ink jet printing apparatus an ink composition comprising silica particles wherein dyes are covalently bonded to the particle surfaces through silane coupling agents and forming images on a substrate.

The ink compositions of the present invention comprise colloidal aqueous suspensions of colored silicas prepared from hydrophilic porous silicas. Hydrophilic silicas are generally colorless, and possess surfaces covered with silanols that react with many functional groups to form covalent linkages. To effect coloration of these silicas, the silica is first reacted with a hydroxyalkyl silane or aminoalkyl silane coupling agent to attach the linking agent to the silica surface. Subsequently, a reactive dye is reacted with the linking agent to yield silica particles covalently attached to a dye through a coupling agent. The dye, being covalently bound to the coupling agent, is not subject to leaching or separating from the particles, which reduces or eliminates toxicity of the ink composition. A typical reaction sequence is shown schematically below:

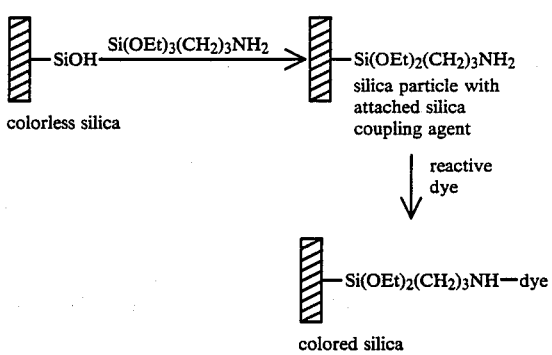

colorless silica → silica particle with attached silica coupling agent → (reactive dye) → colored silica This reaction sequence illustrates the reaction of silica with 3-aminopropyltriethoxysilane to yield silica having covalently attached thereto a 3-aminopropyltriethoxysilane group, which is then reacted with a reactive dye to yield a silica particle having covalently attached thereto a 3-aminopropyltriethoxysilane group, to which is covalently attached a reactive dye.

Suitable porous silicas are hydrophilic in nature and include fumed silicas. In general, the silica particles are of the class prepared industrially at high temperatures by the reaction of tetrachlorosilane with hydrogen, oxygen, and water, as disclosed by E. Wagner and H. Brunner, Angew. Chem., vol. 72, page 744 (1960), the disclosure of which is totally incorporated herein by reference. The particles have high surface areas of from about 130 to about 380 square meters per gram and primary particle sizes of from about 10 nanometers to about 20 nanometers. These primary particles cluster into aggregates ranging in size from about 50 to about 500 nanometers. Silica particle size remains essentially unchanged after the reactions with the coupling agent and the dye. Examples of suitable silicas include Aerosil ® 200, which has a surface area of 200 square meters per gram, and Aerosil ® 380, which has a surface area of 380 square meters per gram, both available from Degussa, Aerosil ® 90, Aerosil ® 130, Aerosil ® 150, Aerosil ® 300, Aerosil ® OX50, Aerosil ® TT600, Aerosil ® MOX 80, and Aerosil ® MOX 170, all available from Degussa, and Cabosil ® L90, Cabosil ® LM130, Cabosil ® LM5, Cabosil ® M-5, Cabosil ® PTG, Cabosil ® MS-55, Cabosil ® HS-5, and Cabosil ® EH-5, all available from Cabot Corporation. Prior to reaction with the coupling agents, the silica particles are treated to remove water by subjecting them to heating at 100° to 150° C. under vacuum for 24 hours and storing them in a dessicator.

Examples of suitable coupling agents include hydroxyalkyl silanes and aminoalkyl silanes. Preferably, the alkyl portion of the coupling agent has from about 2 to about 10 carbon atoms, and most preferably is a propyl group or a butyl group. Also suitable are hydroxyalkylaryl silanes, aminoalkylaryl silanes, hydroxyaryl silanes, and aminoaryl silanes. Hydroxyalkyl silanes, aminoalkyl silanes, hydroxyalkylaryl silanes, aminoalkylaryl silanes, hydroxyaryl silanes, and aminoaryl silanes, as defined herein, also include substituted compounds with from 1 to 3 alkoxy substituent groups attached to the silane portion of the molecule. Examples of suitable coupling agents are aminopropyltriethoxysilane, N,N-(2'hydroxyethyl)-3-aminopropyltriethoxysilane, 4-aminobutyltriethoxysilane, (aminoethyl)(aminomethyl)-phenethyltrimethoxysilane, N-(2-aminoethyl)-3-aminopropyltrimethoxysilane, N-(2-aminoethyl)-3-aminopropyltrimethoxysilane, p-aminophenyltriethoxysilane, N-(2-aminoethyl)-3-aminopropylmethyldimethoxysilane, 3-aminopropyltrimethoxysilane, 3-aminopropylmethyldimethoxysilane, and the like.

Suitable dyes include those that are water-soluble and react rapidly and in high yield with hydroxyl or amino groups. Generally, suitable dyes for the present invention are of the class known as reactive dyes and widely used in the textile industry. The dyes comprise a chromophore soluble in water, such as an anthraquinone, a monoazo dye, a disazo dye, a phthalocyanine, an aza[1-8]annulene, a formazan copper complex, a triphenodioxazine, and the like, to which is covalently attached a reactive group, such as a dichlorotriazine, a monochlorotriazine, a dichloroquinoxaline, an aminoepoxide, a mono-(m'-carboxypyridinium)-triazine, a 2,4,5-trihalogenopyrimidine, a 2,4-dichloropyrimidine, a 2,3-dichloroquinoxaline, a monofluorotriazine, a 4,5-dichloro-6-methyl-2-methylsulfonylpyrimidine, a 1,4-dichlorophthalazine, a chlorobenzothiazole, a sulfatoethylsulfone, a β-chloroethylsulfone, a 4,5-dichloro-6-pyridazone, an α-bromoacryloylamido, an α,β-dibromopropionylamido, and the like. Examples of suitable dyes include Levafix Brilliant Yellow E-GA, Levafix Yellow E2RA, Levafix Black EB, Levafix Brilliant Red E6BA, and Levafix Brilliant Blue EFFA, available from Bayer, Procion Turquoise PA, Procion Turquoise HA, Procion Turquoise H-5G, Procion Turquoise H-7G, Procion Red MX-5B, Procion Red MX 8B GNS, Procion Red G, Procion Yellow MX-8G, Procion Blue MX-R, Procion Blue MX-4GD, Procion Blue MX-G, and Procion Blue MX-2GN, available from ICI, Cibacron Red F-B, Lanasol Red 5B, Lanasol RED B, and Lanasol Yellow 4G, available from Ciba-Geigy, Basilen Black P-BR, Basilen Yellow EG, Basilen Brilliant Yellow P-3GN, Basilen Yellow M-6GD, Basilen Brilliant Red P-3B, Basilen Scarlet E-2G, Basilen Red E-B, Basilen Red E-7B, Basilen Red M-5B, Basilen Blue E-R, Basilen Brilliant Blue P-3R, Basilen Turquoise Blue P-GR, Basilen Turquoise M-2G, Basilen Turquoise E-G, and Basilen Green E-6B, available from BASF, Sumifix Turquoise Blue G, Sumifix Yellow 2GC, and Sumifix Brilliant Red 5BF, available from Sumitomo Chemical Company, and the like.

Generally, the coloreless silica particles are first reacted with the silane coupling agent in the absence of water, followed by reaction of the coupling agent with the dye. A solution is prepared containing a solvent such as dry toluene, benzene, xylene, hexane, or other similar aromatic or aliphatic solvents, containing the coupling agent in a relative amount of from about 0.1 to about 10 weight percent, and preferably from about 2 to about 5 weight percent. The dry silica particles are then suspended in the solution in a relative amount of from about 0.1 to about 10 weight percent, and preferably from about 1 to about 5 weight percent, and the suspension is subsequently heated at reflux temperature, which generally is about 111° C., for 2 to 24 hours, and preferably from 4 to 8 hours. During the process, water generated by the reaction is removed by a Dean-Stark trap. The process yields silica particles having silane coupling agents covalently attached thereto. These particles are separated from the suspension by high speed centrifugation (over 10,000 r.p.m.) or filtration after the suspension has cooled to room temperature, and the particles are washed, first with toluene and then methanol, and dried. Dyeing of the particles is effected by suspending the particles in water in a relative amount of from about 0.1 to about 20 weight percent, and preferably from about 5 to about 10 weight percent, and then adding the dye in a relative amount of from about 0.5 to about 10 weight percent, preferably from about 1 to about 4 weight percent, and stirring at room temperature for about 4 to 48 hours and preferentially for about 6 to about 24 hours to yield colored silica particles. The colored particles generally comprise from about 65 to about 98, and preferably from about 90 to about 95 percent by weight of the silica, from about 1 to about 20, and preferably from about 5 to about 10 percent by weight of the coupling agent, and from about 1 to about 30, and preferably from about 5 to about 15 percent by weight of the dye. In general, the formed particles are from about 50 to about 500 nanometers in average particle diameter, and preferably are from about 100 to about 300 nanometers in average particle diameter, as determined by Brookhaven BI-90 Particle Sizer.

Particles thus formed are incorporated into a liquid medium to form an ink suitable for ink jet printing. The liquid medium generally comprises water, which may be distilled water, in an amount of from about 40 to about 95 percent by weight, and a glycol, such as ethylene glycol, diethylene glycol, propylene glycol, mixtures thereof, and the like, present in an amount of from about 5 to about 60 percent by weight. Alternatively, the liquid medium may comprise water, preferably present in an amount of from about 80 to about 95 percent by weight, and a water-miscible solvent such as dimethylsulfoxide or sulfolane, preferably present in an amount of from about 5 to about 20 percent by weight. The liquid medium may also include a biocide, such as sorbitol and the like, present in an amount of from about 0.1 to about 1.0 percent by weight of the water/glycol liquid medium, surfactants such as sodium dodecyl sulfate, cetyl trimethylammonium chloride, Triton X-100, and the like, present in an amount of from about 0.1 to about 1.0 percent by weight of the water/glycol liquid medium, and/or dispersants such as polyethylene glycol-1500, poly-N-vinylpyrrolidone, Disperbyk BYK, Daxad 30S, Daxad 19, Solsperse 20,000, and the like, present in an amount of from about 0.1 to about 1.0 percent by weight of the water/glycol liquid medium. The colored silica particles are added to the liquid medium in an amount of from about 1 to about 10 percent by weight of the water/glycol liquid medium. Other additives may also be present, provided that the objectives of the present invention are achieved. Ink compositions of the present invention are prepared by dispersing the colored silica particles in water by methods such as, for example, mechanical stirring, ball milling, or sonication, after which the glycol and any other ingredients are added. The suspension thus obtained may be filtered through a 1-micron filter to remove particles exceeding 1 micron in size.

Ink compositions thus prepared are suitable for use in ink jet printing processes. Inks of the present invention may be incorporated into an ink jet printer, such as the Diablo C150 I J printer, the Hewlett Packard Desk Jet printer, the Diablo C150 TIJ printer, and the like, and images may be generated onto substrates such as transparencies, plain paper, coated paper, cloth, and the like by ejecting droplets of the ink onto the substrate to form an image by ink jet printing processes described herein, such as continuous stream, piezoelectric drop-on-demand, bubble jet or thermal ink jet processes.

Specific embodiments of the invention will now be described in detail. These examples are intended to be illustrative, and the invention is not limited to the materials, conditions, or process parameters set forth in these embodiments. All parts and percentages are by weight unless otherwise indicated.

ATTACHMENT OF COUPLERS TO SILICA PARTICLES

Example I

To 9.6 grams of Aerosil ® 200, which had been dried at 100° C. for 24 hours in a 500 milliliter round bottom flask equipped with a magnetic stirrer and a Dean-Stark trap, were added 300 milliliters of toluene, which had previously been dried by azeotropic distillation under nitrogen, and 2.96 grams of aminopropyltriethoxysilane. The resulting suspension was refluxed at 111° C. for 5 hours, cooled to room temperature, and centrifuged at about 10,000 r.p.m., after which the supernatant liquid was poured off and the precipitate washed with 500 milliliters of dichloromethane. Subsequently, the mixture of precipitate and dicloromethane was centrifuged, the supernatant was removed, and the residue was dried in a vacuum oven at about 200 mm Hg at 40° C. for 2.5 days to yield 9.6 grams (76% yield) of a white powdery material comprising Aerosil ® 200 particles having covalently attached thereto aminopropyltriethoxysilane groups, as determined by the techniques described by M. W. Urban and J. L. Koenig in "Determination of the Orientation of Silanes on Silica Surfaces by Fourier Transform Infrared Photoacoustic Spectroscopy," Applied Spectroscopy, Vol 40, no. 4, pages 513 to 519 (1986) and T. G. Waddell, D. E. Layden, and M. T. DeBello in "The Nature of Organosilane to Silica Surface Bonding," Journal of the American Chemical Society, Vol. 103, pages 5303 to 5307 (1981), the disclosures of each of which are totally incorporated herein by reference.

Example II

To 49.38 grams of Aerosil ® 380, which had been dried at 110° C. for 22 hours in a 1,000 milliliter round bottom flask equipped with a mechanical stirrer and a Dean-Stark trap, were added 900 milliliters of toluene, which had previously been dried by azeotropic distillation under nitrogen, and 61.5 milliliters of aminopropyltriethoxysilane. The reaction mixture was refluxed at 111° C. for 5 hours, cooled to room temperature, and centrifuged at about 3,000 r.p.m., after which the supernatant liquid was poured off and the precipitate washed with 500 milliliters of methanol. Subsequently, the mixture of precipitate and methanol was centrifuged twice, the supernatant was removed, and the residue was again washed with 500 milliliters of water and centrifuged twice. The residue was redispersed in water and freeze-dried to yield 29.4 grams (37.5% yield) of a white powdery material comprising Aerosil ® 380 particles having covalently attached thereto aminopropyltriethoxysilane groups, as determined by the techniques described by M. W. Urban and J. L. Koenig in "Determination of the Orientation of Silanes on Silica Surfaces by Fourier Transform Infrared Photoacoustic Spectroscopy," Applied Spectroscopy, Vol 40, no. 4, pages 513 to 519 (1986) and T. G. Waddell, D. E. Layden, and M. T. DeBello in "The Nature of Organosilane to Silica Surface Bonding," Journal of the American Chemical Society, Vol. 103, pages 5303 to 5307 (1981).

Example III

To 38.61 grams of Aeorsil® 380, which had been dried at 100° C. for 24 hours in a 2,000 milliliter round bottom flask equipped with a magnetic stirrer, a reflux condenser, and a thermometer, were added 800 milliliters of toluene, which had previously been dried by azeotropic distillation under nitrogen, and 96.1 milliliters of aminopropyltriethoxysilane. The reaction mixture was refluxed at 111° C. for 6 hours, cooled to room temperature, and filtered through a Whatman GFF/A filter paper. Subsequently, the solid was stirred in methanol for about 17 hours and refiltered, and the resulting solid was redispersed in methanol with a polytron and filtered a third time. The resulting solid was dried in a vacuum oven for 22 hours to yield 44.5 grams (75% yield) of a white powdery material comprising Aerosil® 380 particles having covalently attached thereto aminopropyltriethoxysilane groups, as determined by the techniques described by M. W. Urban and J. L. Koenig in "Determination of the Orientation of Silanes on Silica Surfaces by Fourier Transform Infrared Photoacoustic Spectroscopy," Applied Spectroscopy, Vol 40, no. 4, pages 513 to 519 (1986) and T. G. Waddell, D. E. Layden, and M. T. DeBello in "The Nature of Organosilane to Silica Surface Bonding," Journal of the American Chemical Society, Vol. 103, pages 5303 to 5307 (1981).

Example IV

To 10 grams of Aerosil® 380, which had been dried at 150° C. for 20 hours in a 500 milliliter round bottom flask equipped with a magnetic stirrer and a reflux condenser, were added 273 milliliters of ethanol and 26.5 milliliters of an ethanol solution containing 62 percent by weight of N,N-bis-(2-hydroxyethyl)aminopropyltriethoxysilane. The reaction mixture was refluxed at 111° C. for 20 hours, cooled to room temperature, and centrifuged at about 8,000 r.p.m., after which the supernatant liquid was poured off and the precipitate washed with 500 milliliters of ethanol and centrifuged. Subsequently, the residue was washed and centrifuged twice with water, and the residue was redispersed in water and freeze-dried to yield 6.6 grams (36.2% yield) of a white powdery material comprising Aerosil® 380 particles having covalently attached thereto N,N-bis-(2-hydroxyethyl)aminopropyltriethoxysilane groups, as determined by the techniques described by M. W. Urban and J. L. Koenig in "Determination of the Orientation of Silanes on Silica Surfaces by Fourier Transform Infrared Photoacoustic Spectroscopy," Applied Spectroscopy, Vol 40, no. 4, pages 513 to 519 (1986) and T. G. Waddell, D. E. Layden, and M. T. DeBello in "The Nature of Organosilane to Silica Surface Bonding," Journal of the American Chemical Society Vol. 103, pages 5303 to 5307 (1981).

Example V

To 19.86 grams of Aerosil® 380, which had been dried at 100° C. for 24 hours in a 2,000 milliliter round bottom flask equipped with a mechanical stirrer, a thermometer, a reflux condenser, and a Dean-Stark trap, were added 500 milliliters of toluene, which had previously been dried by azeotropic distillation under nitrogen, and 52.5 milliliters of an ethanol solution containing 62 percent by weight of N,N-bis-(2-hydroxyethyl)aminopropyltriethoxysilane. The reaction mixture was heated and the distillate in the Dean-Stark trap was discarded until the reaction mixture reached 111° C., after which the reaction mixture was refluxed at 111° C. for 6 hours and filtered with Whatman filter paper. The resulting precipitate was slurried in 500 milliliters so methanol, filtered with Whatman filters, and dried in vacuo at 120° C. for 24 hours to yield 21.87 grams of a white powdery material comprising Aerosil® 380 particles having covalently attached thereto N,N-bis-(2-hydroxyethyl)aminopropyltriethoxysilane groups, as determined by the techniques described by M. W. Urban and J. L. Koenig in "Determination of the Orientation of Silanes on Silica Surfaces by Fourier Transform Infrared Photoacoustic Spectroscopy," Applied Spectroscopy, Vol 40, no. 4, pages 513 to 519 (1986) and T. G. Waddell, D. E. Layden, and M. T. DeBello in "The Nature of Organosilane to Silica Surface Bonding," Journal of the American Chemical Society, Vol. 103, pages 5303 to 5307 (1981).

COLORATION OF SILICA PARTICLES

Example VI

A mixture of 1.0 gram of silica particles with attached couplers prepared according to the method of Example I and 1.0 gram of Levafix Brilliant Blue EFFA (available from Bayer) in 40 milliliters of water was stirred at room temperature for 18 hours in a round bottom flask equipped with a magnetic stirrer and was subsequently centrifuged. The residue was dispersed in water and centrifuged in water until the supernatant was colorless, after which the residue was redispersed in water and freeze-dried with a Dura-Dry ™ freeze drier, available from FTS® Systems, Stone Ridge, NY, to yield 0.75 gram of blue silica particles.

Example VII

A mixture of 1.0 gram of silica particles with attached couplers prepared according to the method of Example I and 1.0 gram of Levafix Brilliant Red E6BA (available from Bayer) in 35 milliliters of water was stirred at room temperature for 18 hours in a round bottom flask equipped with a magnetic stirrer and was subsequently centrifuged. The residue was dispersed in water and centrifuged in water until the supernatant was colorless, after which the residue was redispersed in water and freeze-dried with a Dura-Dry ™ freeze drier, available from FTS® Systems, Stone Ridge, NY, to yield 0.60 gram of red silica particles.

Example VIII

A mixture of 3.0 grams of silica particles with attached couplers prepared according to the method of Example II and 3.0 grams of Levafix Brilliant Red E6BA (available from Bayer) in 120 milliliters of water was stirred at room temperature for 22 hours in a round bottom flask equipped with a magnetic stirrer and was subsequently centrifuged. The residue was dispersed in water and centrifuged in water until the supernatant was colorless, after which the residue was redispersed in water and freeze-dried with a Dura-Dry ™ freeze drier, available from FTS® Systems, Stone Ridge, NY, to yield 2.3 grams of red silica particles.

Example IX

A mixture of 1.0 gram of silica particles with attached couplers prepared according to the method of Example II and 2.0 grams of Procion Turquoise HA (available from ICI) in 50 milliliters of water was stirred at reflux temperature for 3.5 hours in a round bottom flask equipped with a magnetic stirrer and a condenser and was subsequently cooled to room temperature and centrifuged. The residue was dispersed in water and centrifuged in water until the supernatant was colorless, after which the residue was redispersed in water and freeze-dried with a Dura-Dry TM freeze drier, available from FTS ® Systems, Stone Ridge, NY, to yield 1.0 gram of cyan silica particles.

Example X

A mixture of 3.0 grams of silica particles with attached couplers prepared according to the method of Example II and 3.0 grams of Levafix Brilliant Blue EFFA (available from Bayer) in 120 milliliters of water was stirred at room temperature for 22 hours in a round bottom flask equipped with a magnetic stirrer and was subsequently centrifuged. The residue was dispersed in water and centrifuged in water until the supernatant was colorless, after which the residue was redispersed in water and freeze-dried with a Dura-Dry TM freeze drier, available from FTS ® Systems, Stone Ridge, NY, to yield 2.4 grams of blue silica particles.

Example XI

A mixture of 3.0 grams of silica particles with attached couplers prepared according to the method of Example III and 13.0 grams of Levafix Brilliant Blue EFFA (available from Bayer) in 300 milliliters of water was stirred at room temperature for 22 hours in a round bottom flask equipped with a magnetic stirrer and was subsequently centrifuged. The residue was dispersed in water and centrifuged in water until the supernatant was colorless, after which the residue was redispersed in water and freeze-dried with a Dura-Dry TM freeze drier, available from FTS ® Systems, Stone Ridge, NY, to yield 2.2 grams of blue silica particles.

Example XII

To a mixture of 31.0 grams of silica particles with attached couplers prepared according to the method of Example III and dried at 100° C. for 17 hours and Levafix Brilliant Blue EFFA (available from Bayer, Inc.) was added one liter of water. The resulting mixture was ball milled at room temperature for 3 days and then filtered with Whatman filter paper. The resulting precipitate was washed with 1 liter of water and filtered with Whatman filter paper, after which the resulting hy-solid was dispersed in water. This dispersion was dialyzed against water using a Spectrapor 4 membrane, available from Canlab, for about 3 days, at which time the water remained colorless. The suspension was then freeze-dried with a Dura-Dry TM freeze drier, available from FTS ® Systems, Stone Ridge, NY, to yield 10 grams of blue silica particles.

PREPARATION AND TESTING OF AN INK JET INK

Example XIII

Porous colorless silica particles were colored blue by the procedure described in Example XII. The amount of dye attached to the silica surface was determined to be 40 percent by weight, as determined by measuring the UV/Visible absorption spectrum of the silica particles suspended in dimethyl sulfoxide (DMSO).

The blue silica particles were suspended in a mixture of water and DMSO (80/20 v/v) and jetted in a Diablo C150 I J printer on coated paper FC3 from JuJo Paper and on Xerox ® 4024 plain paper. Prints of excellent edge acuity and color, and waterfastness of over 95 percent were obtained on both papers. Optical densities of the prints were 1.84 on coated paper and 1.10 on Xerox ® 4024 paper.

Example XIV

Porous colorless silica particles were colored blue by the procedure described in Example XII. The amount of dye attached to the silica surface was determined to be 40 percent by weight, as determined by measuring the UV/Visible absorption spectrum of the silica particles suspended in DMSO. The blue silica particles were suspended in a mixture of water and ethylene glycol (95/5v/v) in an amount such that the resulting ink had a colored silica concentration of 8 weight percent and jetted in a Diablo C150 I J printer on coated paper FC3 from JuJo Paper and on Xerox ® 4024 plain paper. Prints of excellent edge acuity and color, and waterfastness of over 95 percent, were obtained on both papers. Optical densities of the prints were 1.67 on coated paper and 1.04 on Xerox ® 4024 paper.

Other embodiments and modifications of the present invention may occur to those skilled in the art subsequent to a review of the information presented herein; these embodiments and modifications, as well as equivalents thereof, are also included within the scope of this invention.

What is claimed is:

1. An ink jet ink composition which comprises water; a solvent selected from the group consisting of glycols, dimethylsulfoxide, and sulfolane; and a plurality of colored particles comprising hydrophilic porous silica particles, to the surface of which dyes are covalently bonded through silane coupling agents.

2. An ink composition according to claim 1 wherein the hydrophilic porous silica particles comprise fumed silica.

3. An ink composition according to claim 1 wherein the hydrophilic porous silica particles have a surface area of from about 50 to about 380 square meters per gram.

4. An ink composition according to claim 1 wherein the silane coupling agent is selected from the group consisting of hydroxyalkyl silanes, aminoalkylsilanes, hydroxyalkylaryl silanes, aminoalkylaryl silanes, hydroxyaryl silanes, aminoaryl silanes, and mixtures thereof.

5. An ink composition according to claim 1 wherein the coupling agent is selected from the group consisting of aminopropyltriethoxysilane, N,N-(2'hydroxyethyl)-3-aminopropyltriethoxysilane,4-aminobutyltriethoxysilane,(aminoethyl)-(aminomethyl)phenethyltrimethoxysilane, N-(2-aminoethyl)-3-aminopropyltrimethoxysilane, p-aminophenyltriethoxysilane, N-(2-aminoethyl)-3-aminopropylmethyldimethoxysilane, 3-aminopropyltrimethoxysilane, 3-aminopropylmethyldimethoxysilane, and mixtures thereof.

6. An ink composition according to claim 1 wherein the dye comprises a Reactive Dye.

7. An ink composition according to claim 1 wherein the dye is selected from the group consisting of anthraquinones, monoazo dyes, disazo dyes, phthalocyanines, aza[18]annulenes, formazan copper complexes, and triphenodioxazines, to which are covalently attached reactive groups.

8. An ink composition according to claim 1 wherein the dye includes a reactive group selected from the group consisting of dichlorotriazines, monochlorotriazines, dichloroquinoxalines, aminoepoxides, mono-(m'-carboxypyridinium)-triazines, 2,4,5-trihalogenopyrimidines,2,4-dichloropyrimidines,2,3-dichloroquinoxalines, monofluorotriazines, 4,5-dichloro-6-methyl-2-methylsulfonylpyrimidines, 1,4-dichlorophthalazines, chlorobenzo-thiazoles, sulfatoethylsulfones, β-chloroethylsulfones, 4,5-dichloro-6-pyridazones, α-bromoacryloylamidos, and α,β-dibromopropionylamidos.

9. An ink composition according to claim 1 wherein the colored particles comprise from about 65 to about 98 percent by weight of silica, from about 1 to about 20 percent by weight of the coupling agent, and from about 1 to about 30 percent by weight of the dye.

10. An ink composition according to claim 1 wherein the liquid medium comprises water present in an amount of from about 40 to about 95 percent by weight and a glycol present in an amount of from about 5 to about 40 percent by weight, and the colored particles are present in an amount of from about 2 to about 10 percent by weight of the liquid medium.

11. An ink composition according to claim 1 wherein the glycol is selected from the group consisting of ethylene glycol, diethylene glycol, propylene glycol, and mixtures thereof.

12. An ink composition according to claim 1 wherein the ink contains a biocide.

13. An ink composition according to claim 12 wherein the biocide is present in an amount of from about 0.1 to about 1.0 percent by weight.

14. An ink composition according to claim 1 wherein the ink contains a surfactant.

15. An ink composition according to claim 14 wherein the surfactant is present in an amount of from about 0.1 to about 1.0 percent by weight.

16. An ink composition which comprises water; a solvent selected from the group consisting of glycols, dimethylsulfoxide, and sulfolane; and a plurality of colored particles comprising hydrophilic porous silica particles, to the surface of which dyes are covalently bonded through silane coupling agents; wherein the particles are prepared by a process which comprises reacting hydrophilic porous silica particles with a silane coupling agent in the absence of water to form particles having covalently attached thereto coupling agents, followed by reacting a dye with the coupling agent.

17. An ink composition according to claim 16 wherein the hydrophilic porous silica particles comprise fumed silica.

18. An ink composition according to claim 16 wherein the hydrophilic porous silica particles have a surface area of from about 50 to about 380 square meters per gram.

19. An ink composition according to claim 16 wherein the silane coupling agent is selected from the group consisting of hydroxyalkyl silanes, aminoalkyl silanes, hydroxyalkylaryl silanes, aminoalkylaryl silanes, hydroxyaryl silanes, aminoaryl silanes, and mixtures thereof.

20. An ink composition according to claim 16 wherein the coupling agent is selected from the group consisting of 3-aminopropyltriethoxysilane, N,N-(2'-hydroxyethyl)-3-aminopropyltriethoxysilane, 4-aminobutyltriethoxysilane,(aminoethyl)-(aminomethyl)-phenethyltrimethoxysilane, N-(2-aminoethyl)-3-aminopropyltrimethoxysilane, p-aminophenyltriethoxysilane, N-(2-aminoethyl)-3-aminopropylmethyldimethoxysilane, 3-aminopropyltrimethoxysilane, 3-aminopropylmethyldimethoxysilane, and mixtures thereof.

21. An ink composition according to claim 16 wherein the dye comprises a Reactive Dye.

22. An ink composition according to claim 16 wherein the dye is selected from the group consisting of anthraquinones, monoazo dyes, disazo dyes, phthalocyanines, aza[18]annulenes, formazan copper complexes, and triphenodioxazines, to which are covalently attached a reactive group.

23. An ink composition according to claim 16 wherein the dye includes a reactive group selected from the group consisting of dichlorotriazines, monochlorotriazines, dichloroquinoxalines, aminoepoxides, mono-(m'-carboxypyridinium)-triazines, 2,4,5-trihalogenopyrimidines,2,4-dichloropyrimidines,2,3-dichloroquinoxalines, monofluorotriazines, 4,5-dichloro-6-methyl-2-methylsulfonylpyrimidines, 1,4-dichlorophthalazines, chlorobenzo-thiazoles, sulfatoethylsulfones, β-chloroethylsulfones, 4,5-dichloro-6-pyridazones, α-bromoacryloylamidos, and α,β-dibromopropionylamidos.

24. An ink composition according to claim 16 wherein the particles comprise from about 65 to about 98 percent by weight of the silica, from about 1 to about 20 percent by weight of the coupling agent, and from about 1 to about 30 percent by weight of the dye.

25. An ink composition according to claim 16 wherein the water is present in the ink liquid in an amount of from about 40 to about 95 percent by weight, the glycol is present in an amount of from about 5 to about 40 percent by weight, and the particles are present in an amount of from about 2 to about 10 percent by weight.

26. A process for generating images which comprises incorporating into an ink jet printing apparatus the ink composition of claim 1 and forming images by causing the ink to be expelled in droplets onto a substrate, thereby generating an image on the substrate.

27. A process according to claim 26 wherein the silane coupling agent for the ink is selected from the group consisting of hydroxyalkyl silanes, aminoalkyl silanes, hydroxyalkylaryl silanes, aminoalkylaryl silanes, hydroxyaryl silanes, aminoaryl silanes, and mixtures thereof.

28. A process according to claim 26 wherein the coupling agent for the ink is selected from the group consisting of 3-aminopropyltriethoxysilane, N,N-(2'-hydroxyethyl)-3-aminopropyltriethoxysilane,4-aminobutyltriethoxysilane,(aminoethyl)-(aminomethyl)-phenethyltrimethoxysilane, N-(2-aminoethyl)-3-aminopropyltrimethoxysilane, p-aminophenyltriethoxysilane, N-(2-aminoethyl)-3-aminopropylmethyldimethoxysilane, 3-aminopropyltrimethoxysilane, 3-aminopropylmethyldimethoxysilane, and mixtures thereof.

29. A process according to claim 26 wherein the dye for the ink jet composition comprises a Reactive Dye.

30. A process according to claim 26 wherein the dye is selected from the group consisting of anthraquinones, monoazo dyes, disazo dyes, phthalocyanines, aza[18]annulenes, formazan copper complexes, and triphenodioxazines, to which are covalently attached a reactive group.

31. A process according to claim 26 wherein the dye includes a reactive group selected from the group consisting of dichlorotriazines, monochlorotriazines, dichloroquinoxalines, aminoepoxides, mono-(m'-carboxypyridinium)-triazines, 2,4,5-trihalogenopyrimidines, 2,4-dichloropyrimidines, 2,3-dichloroquinoxalines, monofluorotriazines, 4,5-dichloro-6-methyl-2-methylsulfonylpyrimidines, 1,4-dichlorophthalazines, chlorobenzo-thiazoles, sulfatoethylsulfones, β-chloroethylsulfones, 4,5-dichloro-6-pyridazones, α-bromoacryloylamidos, and α,β-dibromopropionylamidos.

32. A process according to claim 26 wherein the particles for the ink comprise from about 65 to about 98 percent by weight of the silica, from about 1 to about 20 percent by weight of the coupling agent, and from about 1 to about 30 percent by weight of the dye.

33. A process according to claim 26 wherein the liquid medium comprises water in an amount of from about 40 to about 95 percent by weight and glycol in an amount of from about 5 to about 40 percent by weight, and the particles are present in an amount of from about 2 to about 10 percent by weight of the liquid medium.

34. A process according to claim 26 wherein the ink composition comprises particles prepared by a process which comprises reacting hydrophilic porous silica particles with a silane coupling agent in the absence of water to form particles having covalently attached thereto coupling agents, followed by reacting a dye with the coupling agent.

35. A process according to claim 34 wherein the silane coupling agent is selected from the group consisting of hydroxyalkyl silanes, aminoalkyl silanes, hydroxyalkylaryl silanes, aminoalkylaryl silanes, hydroxyaryl silanes, aminoaryl silanes, and mixtures thereof.

36. A process according to claim 34 wherein the dye comprises a Reactive Dye.

37. A process according to claim 34 wherein the liquid medium comprises water in an amount of from about 40 to about 95 percent by weight and glycol in an amount of from about 5 to about 40 percent by weight, and the particles are present in an amount of from about 2 to about 10 percent by weight of the liquid medium.

38. A process for preparing an ink jet ink composition which comprises reacting hydrophilic porous silica particles with a silane coupling agent in the absence of water to form silica particles having covalently attached thereto coupling agents, subsequently reacting a dye with the coupling agent to form colored silica particles to the surface of which the dye is covalently bonded through the silane coupling agent, dispersing the colored silica particles in water, and adding to the dispersion a solvent selected from the group consisting of glycols, dimethyl sulfoxide, and sulfolane.

39. A process according to claim 38 wherein the silane coupling agent is added to a solvent to form a solution, the hydrophilic porous silica particles are subsequently suspended in the solution, the resulting suspension is refluxed for from about 2 to about 24 hours, water is removed during the reflux process, and silica particles having covalently bound thereto the coupling agents are recovered from the suspension.

40. A process according to claim 39 wherein the coupling agent is added to the solvent in an amount of from about 0.1 to about 10 percent by weight.

41. A process according to claim 39 wherein the hydrophilic porous silica particles are suspended in the solution in an amount of from about 0.1 to about 10 percent by weight.

42. A process according to claim 38 wherein the silica particles having covalently attached thereto coupling agents are suspended in water, the dye is added to the suspension, the resulting solution is stirred for from about 4 to about 48 hours, and colored silica particles to the surface of which the dye is covalently bonded through the silane coupling agent are recovered from the solution.

43. A process according to claim 42 wherein the silica particles having covalently attached thereto coupling agents are suspended in water in an amount of from about 0.1 to about 20 percent by weight.

44. A process according to claim 42 wherein the dye is added to the suspension in an amount of from about 0.5 to about 10 percent by weight.

45. A process according to claim 38 wherein the silane coupling agent is added to a solvent to form a solution containing the coupling agent in an amount of from about 0.1 to about 10 percent by weight, the hydrophilic porous silica particles are subsequently suspended in the solution in an amount of from about 0.1 to about 10 percent by weight, the resulting suspension is refluxed for from about 2 to about 24 hours, water is removed during the reflux process, silica particles having covalently bound thereto the coupling agents are recovered from the suspension, the silica particles having covalently attached thereto coupling agents are suspended in water in an amount of from about 0.1 to about 20 percent by weight, the dye is added to the suspension in an amount of from about 0.5 to about 10 percent by weight, the resulting solution is stirred for from about 4 to about 48 hours, and colored silica particles to the surface of which the dye is covalently bonded through the silane coupling agent are recovered from the solution.

46. A process according to claim 45 wherein the suspension of silica particles and coupling agent in the solvent is refluxed at a temperature of about 111° C.

47. An ink jet ink composition which comprises water, a solvent, and a plurality of colored particles comprising hydrophilic porous silica particles, to the surface of which dyes are covalently bonded through silane coupling agents.

* * * * *